United States Patent
Mizutani et al.

(10) Patent No.: US 10,648,634 B2
(45) Date of Patent: May 12, 2020

(54) TWO-COLOR MOLDED LENS

(71) Applicant: Koito Manufacturing Co., Ltd., Tokyo (JP)

(72) Inventors: Keisuke Mizutani, Shizuoka (JP); Kenta Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/180,307

(22) Filed: Nov. 5, 2018

(65) Prior Publication Data

US 2019/0154223 A1    May 23, 2019

(51) Int. Cl.

| | |
|---|---|
| *F21S 41/20* | (2018.01) |
| *B29D 11/00* | (2006.01) |
| *G02B 1/14* | (2015.01) |
| *G02B 1/04* | (2006.01) |
| *G02B 1/18* | (2015.01) |

(52) U.S. Cl.
CPC ........ *F21S 41/28* (2018.01); *B29D 11/00009* (2013.01); *B29D 11/00865* (2013.01); *G02B 1/041* (2013.01); *G02B 1/14* (2015.01); *G02B 1/18* (2015.01)

(58) Field of Classification Search
CPC .............. F21S 41/28; B29D 11/00865; B29D 11/00009; G02B 1/18; G02B 1/14; G02B 1/041
See application file for complete search history.

(56) References Cited

U.S. PATENT DOCUMENTS

| | | | | |
|---|---|---|---|---|
| 5,642,228 | A * | 6/1997 | Takezawa | B29C 37/005 264/1.7 |
| 6,244,653 | B1 * | 6/2001 | Nishio | B29C 45/16 296/201 |
| 2009/0122569 | A1 * | 5/2009 | Ishizu | F21V 3/04 362/516 |
| 2014/0254196 | A1 * | 9/2014 | Moriyama | G02B 6/0001 362/611 |
| 2015/0306838 | A1 * | 10/2015 | Ito | B32B 3/04 428/189 |

FOREIGN PATENT DOCUMENTS

| | | |
|---|---|---|
| JP | 2000-182409 A | 6/2000 |
| JP | 2014-176974 A | 9/2014 |

* cited by examiner

*Primary Examiner* — Tracie Y Green
(74) *Attorney, Agent, or Firm* — Abelman, Frayne & Schwab

(57) ABSTRACT

A two-color molded lens includes: a lens body portion and a lens peripheral wall portion that rises toward an inner surface side of the two-color molded lens from a peripheral edge portion of the lens peripheral wall portion. The two-color molded lens is provided with a hard coating film on an outer surface thereof and an anti-fogging coating film on the inner surface thereof. The primary molded product is formed to wrap around from the lens body portion, the secondary molded product is formed to wrap around from the lens peripheral wall portion, a joining surface between the primary molded product and the secondary molded product is positioned on the lens body portion, and a corner R is set to a value of R0.2 mm or less in the primary molded product.

6 Claims, 6 Drawing Sheets

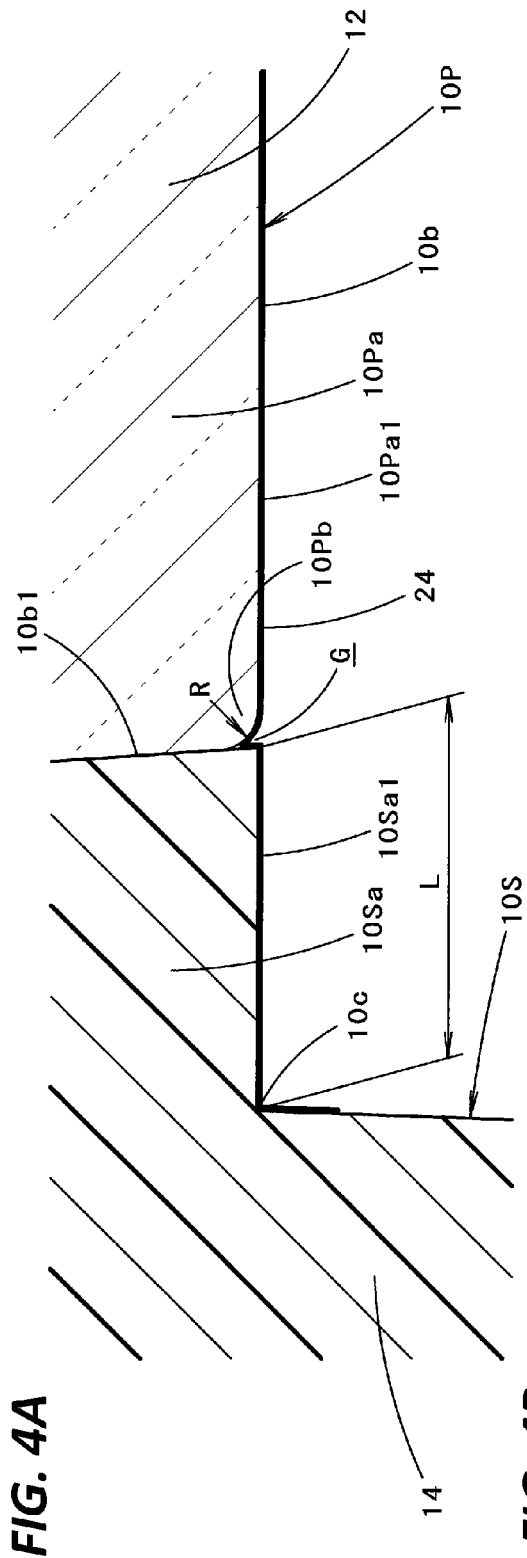
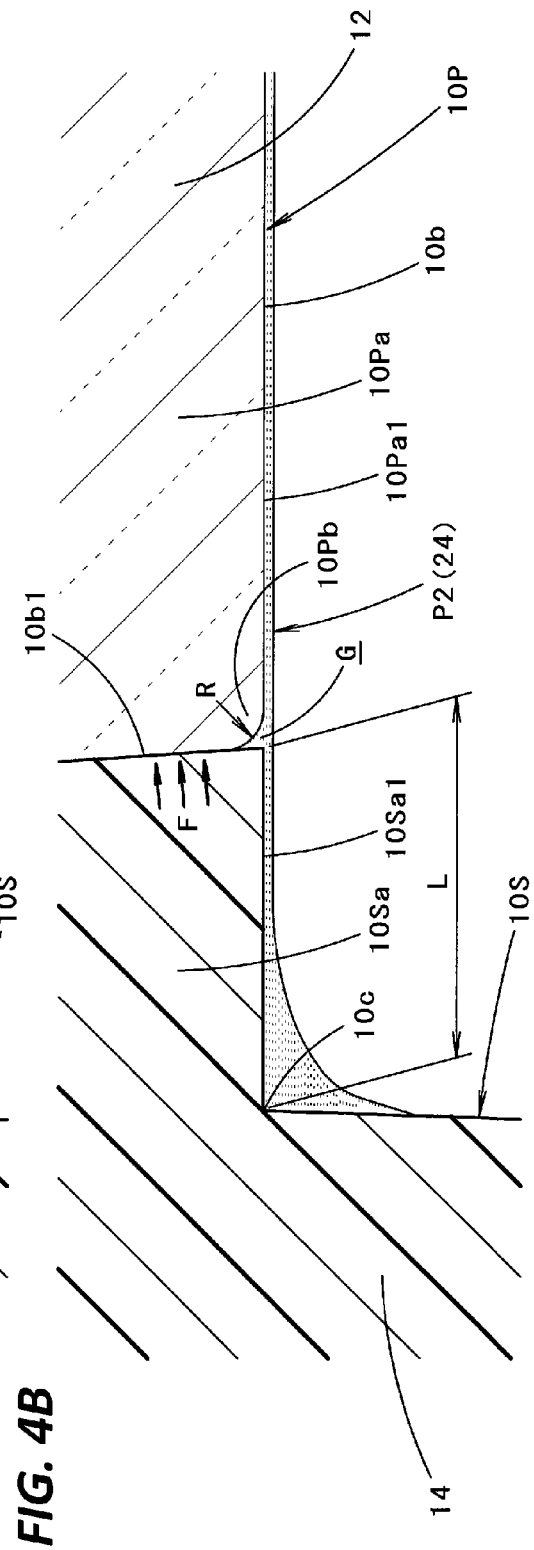
FIG. 4A
FIG. 4B

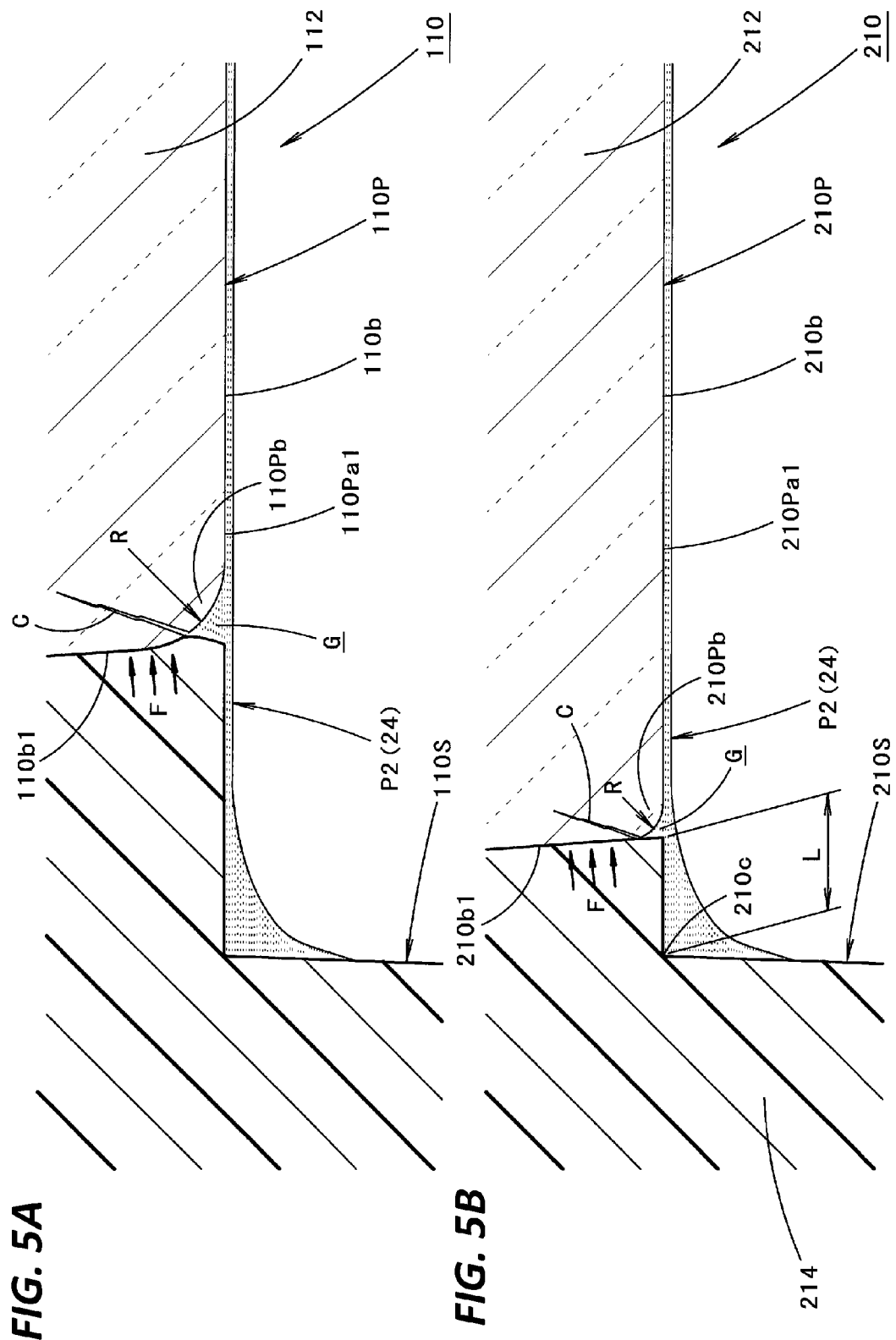

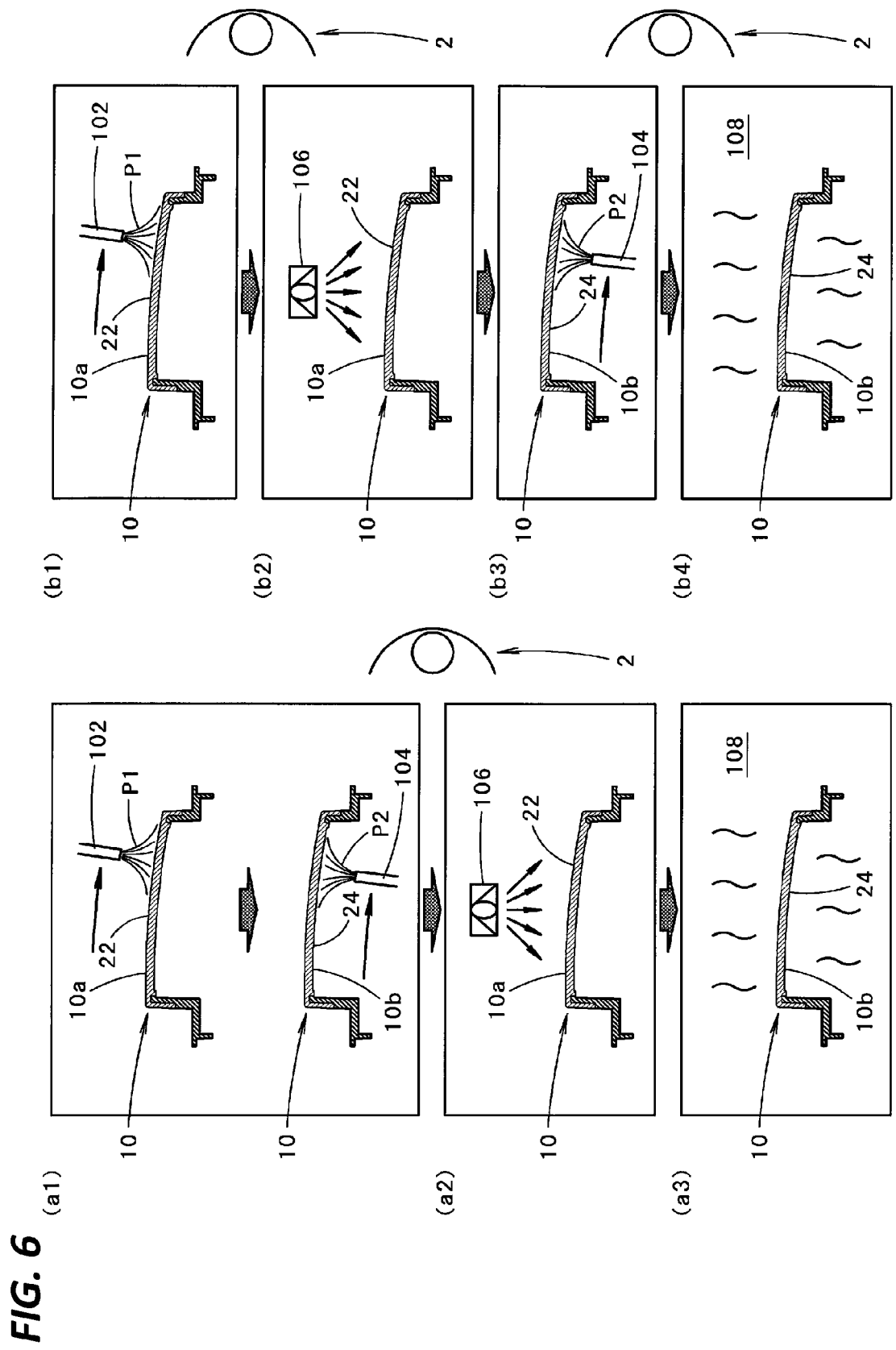

TWO-COLOR MOLDED LENS

CROSS-REFERENCE TO RELATED APPLICATIONS

This application is based on and claims priority from Japanese Patent Application No. 2017-222154, filed on Nov. 17, 2017, with the Japan Patent Office, the disclosure of which is incorporated herein in its entirety by reference.

TECHNICAL FIELD

The present disclosure relates to a two-color molded lens provided with a hard coating film on an outer surface thereof and an anti-fogging coating film on an inner surface thereof.

BACKGROUND

In the related art, a two-color molded lens which is constituted by a primary molded product made of a transparent resin and a secondary molded product made of an opaque resin is known.

As disclosed in, for example, Japanese Patent Laid-Open Publication No. 2014-176974, a two-color molded lens used in a vehicle lamp generally includes a lens body portion and a lens peripheral wall portion which rises toward an inner surface side of the two-color molded lens from a peripheral edge portion of the lens body portion.

In such a two-color molded lens, the primary molded product is formed to wrap around from the lens body portion to the lens peripheral wall portion along an outer surface of the two-color molded lens, and the secondary molded product is formed to wrap around from the lens peripheral wall portion to the lens body portion along an inner surface of the two-color molded lens.

Further, in the related art, in a headlamp lens of a vehicle lamp, a configuration in which a hard coating film is formed on an outer surface of the headlamp lens and an anti-fogging coating film is formed on an inner surface of the headlamp lens is often adopted.

As disclosed in, for example, Japanese Patent Laid-Open Publication No. 2000-182409, such film forming operations are generally performed by two independent steps (hereinafter, referred to as an "independent film forming step"), including forming a hard coating film on an outer surface of a lens and then curing a synthetic resin composite in a coating material by irradiation with ultraviolet rays, and thereafter, forming an anti-fogging coating film on an inner surface of the lens and then curing the anti-fogging coating film by heat.

SUMMARY

In a case of a two-color molded lens where a hard coating film is formed on an outer surface thereof and an anti-fogging coating film is formed on an inner surface thereof, instead of using the "independent film forming step" in the related art, a film forming step (hereinafter, referred to as a "hybrid type film forming step") may be adopted in which a hard coating is formed on the outer surface of the two-color molded lens, an anti-fogging coating film is then formed on the inner surface thereof, and thereafter, the hard coating film is cured by irradiation with ultraviolet rays, and the anti-fogging coating film is then cured by heat. As a result, it is possible to save labor in the film forming step, thereby improving operation efficiency in the manufacturing process of the two-color molded lens.

However, when such a hybrid type film forming step is adopted, the following problems arise.

That is, in the two-color molded lens, the secondary molded product is molded after the primary molded product is molded. Thus, in the primary molded product, a corner R is inevitably formed at a corner portion between the inner surface thereof and a joining surface to the secondary molded product, which is not able to be formed at a pin angle (i.e., R0). In this case, in a typical molding machining, the minimum corner R is about R0.3 mm in view of a structure of an end mill.

Therefore, in the two-color molded lens, a groove-shaped gap having a substantially wedge-shape in cross-section is formed along the corner portion of the primary molded product.

Under such a circumstance, when adopting the hybrid type film forming step, the curing of the anti-fogging coating film is performed after curing the hard coating film by irradiation with ultraviolet rays. Thus, in the two-color molded lens, while curing the hard coating film, the anti-fogging coating material that is stagnant in the groove-shaped gap formed at the corner portion of the primary molded product is impregnated into the inside of the primary molded product. As a result, cracks are likely to be generated around the corner portion of the primary molded product.

In particular, when molding the secondary molded product, the primary molded product arranged in a mold is subjected to a pressing force by the molten resin injected into the mold. Therefore, residual stress is generated around the corner portion of the primary molded product in the two-color molded lens after the molding is completed, and thus, cracks are more likely to be generated.

Then, when cracks are generated around the corner portion of the primary molded product in this manner, the cracks are seen through the transparent lens body portion, so that a defective appearance is generated in the two-color molded lens.

The present disclosure has been made in consideration of the circumstances, and is to provide a two-color molded lens in which a hard coating film is formed on an outer surface thereof and an anti-fogging coating film is formed on an inner surface thereof, and which is capable of effectively suppressing occurrence of the defective appearance after improving the operation efficiency in the manufacturing process thereof.

The present disclosure facilitates the achievement of the above-described object by considering the configuration of the primary molded product.

That is, a two-color molded lens according to the present disclosure is a two-color molded lens including a lens body and a lens peripheral wall portion that rises toward an inner surface side of the two-color molded lens from a peripheral edge portion of the lens body portion. The two-color molded lens is constituted by a primary molded product made of a transparent resin and a secondary molded product made of an opaque resin. The two-color molded lens is provided with a hard coating film on an outer surface thereof and an anti-fogging coating film on the inner surface thereof. The primary molded product is formed to wrap around from the lens body portion to the lens peripheral wall portion along the outer surface of the two-color molded lens. The secondary molded product is formed to wrap around from the lens peripheral wall portion to the lens body portion along the inner surface of the two-color molded lens. A joining surface between the primary molded product and the secondary molded product on the inner surface side of the two-color molded lens is positioned on the lens body portion. In the primary molded product, a corner R formed at a corner portion between the inner surface of the primary molded product and the joining surface is set to a value of R0.2 mm or less.

The "two-color molded lens" is not particularly limited to a specific shape as long as the primary molded product is formed to wrap around from the lens body portion to the lens peripheral wall portion along an outer surface of the two-color molded lens, and the secondary molded product is formed to wrap around from the lens peripheral wall portion to the lens body portion along an inner surface of the two-color molded lens.

The "lens peripheral wall portion" may be formed over the entire periphery of the peripheral edge portion of the lens body portion, or may be formed on a portion thereof.

In the two-color molded lens according to the present disclosure, the secondary molded product is formed to wrap around from the lens peripheral wall portion to the lens body portion along the inner surface of the two-color molded lens, and the joining surface between the primary molded product and the secondary molded product on the inner surface side of the two-color molded lens is positioned on the lens body portion. Thus, in the primary molded product, the corner R is formed at the corner portion between the inner surface of the primary molded product and the joining surface. However, since the corner R is set to a value of R0.2 mm or less, it is possible to make the groove-shaped gap formed at the corner portion of the primary product extremely small.

Therefore, the two-color molded lens according to the present disclosure has a configuration in which a hard coating film is formed on the outer surface thereof and an anti-fogging coating film is formed on the inner surface thereof, but even when such film forming operations are performed by the hybrid type film forming step which has a good operation efficiency, it is possible to minimize the amount of the anti-fogging coating material that is stagnant at the groove-shaped gap formed at the corner portion of the primary molded product.

Therefore, the anti-fogging coating material that is stagnant at the groove-shaped gap formed at the corner portion of the primary molded product is effectively suppressed from being impregnated into the inside of the primary molded product, and thus, the generation of cracks around the corner portion of the primary molded product may be effectively suppressed. As a result, it is possible to effectively suppress occurrence of a defective appearance in the two-color molded lens.

As described above, according to the present disclosure, in the two-color molded lens in which a hard coating film is formed on an outer surface thereof and an anti-fogging coating film is formed on an inner surface thereof, it is possible to effectively suppress occurrence of the defective appearance after improving the operation efficiency in the manufacturing process thereof.

At this time, when the value of the corner R at the corner portion of the primary molded product is set to a value of R0.15 mm or less (e.g., a value of approximately R0.1 mm), the groove-shaped gap formed at the corner portion of the primary molded product becomes much smaller, so that the generation of cracks may be more effectively suppressed. As a result, the occurrence of the defective appearance of the two-color molded lens may be more effectively suppressed.

In the above configuration, when the joining surface between the primary molded product and the secondary molded product on the inner surface side of the two-color molded lens is positioned in the vicinity of the peripheral edge portion of the lens body portion, the majority of the lens body portion may be effectively used as a transparent region.

In this case, when the joining surface is set at a position separated by 0.5 mm from the connection position of the lens body portion and the lens peripheral wall portion on the inner surface side of the two-color molded lens, the following operational effects may be obtained.

That is, when the joining surface positioned in the vicinity of the peripheral edge portion of the lens body portion is excessively close to the connection position of the lens body portion and the lens peripheral wall portion, the anti-fogging coating material that is stagnant around the connection position spreads to the corner portion of the primary molded product and thickly covers the groove-shaped gap, and thus, cracks are likely to be generated around the corner portion of the primary molded product.

Meanwhile, when the joining surface is set at a position separated by 0.5 mm or more from the connection position of the lens body portion and the lens peripheral wall portion on the inner surface side of the two-color molded lens, it is possible to suppress the anti-fogging coating material that is stagnant around the connection position from spreading to the corner portion of the primary molded product. Therefore, it is possible to effectively suppress the groove-shaped gap formed at the corner portion of the primary molded product from being thickly covered with the anti-fogging coating material, so that the generation of cracks around the corner portion of the primary molded product may be effectively suppressed.

At this time, by setting the position of the joining surface at a position separated by 0.7 mm or more (e.g., a position separated by approximately 1 mm) from the connection position of the lens body portion and the lens peripheral wall portion on the inner surface side of the two-color molded lens, it is possible to effectively suppress the anti-fogging coating material that is stagnant around the connection position from spreading to the corner portion of the primary molded product.

With the above configuration, when the inner surface of the primary molded product and the inner surface of the secondary molded product are formed to be flush with each other at the position of the joining surface, it is possible to prevent a step from being formed between the inner surface of the primary molded product and the inner surface of the secondary molded product positioned at both sides of the joining surface. Therefore, the anti-fogging coating material is suppressed from being stagnant around the joining surface on the inner surface side of the two-color molded lens, and thus, the generation of cracks due to the generation of the step may be prevented in advance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4A is a detailed view illustrating a portion of IV in FIG. 3, and FIG. 4B is a view similar to FIG. 4A illustrating the two-color molded lens in the middle of a hybrid type film forming step.

FIG. 5A is a view similar to FIG. 4B illustrating an example of the related art, and FIG. 5B is a view similar to FIG. 4B illustrating a comparative example.

Parts (a1) to (a3) in FIG. 6 are views illustrating a manufacturing process of the two-color molded lens, and parts (b1) to (b4) in FIG. 6 are views illustrating a manufacturing process in the related art in contrast to parts (a1) to (a3) in FIG. 6.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an embodiment of the present disclosure will be described with reference to drawings.

Figure 1:
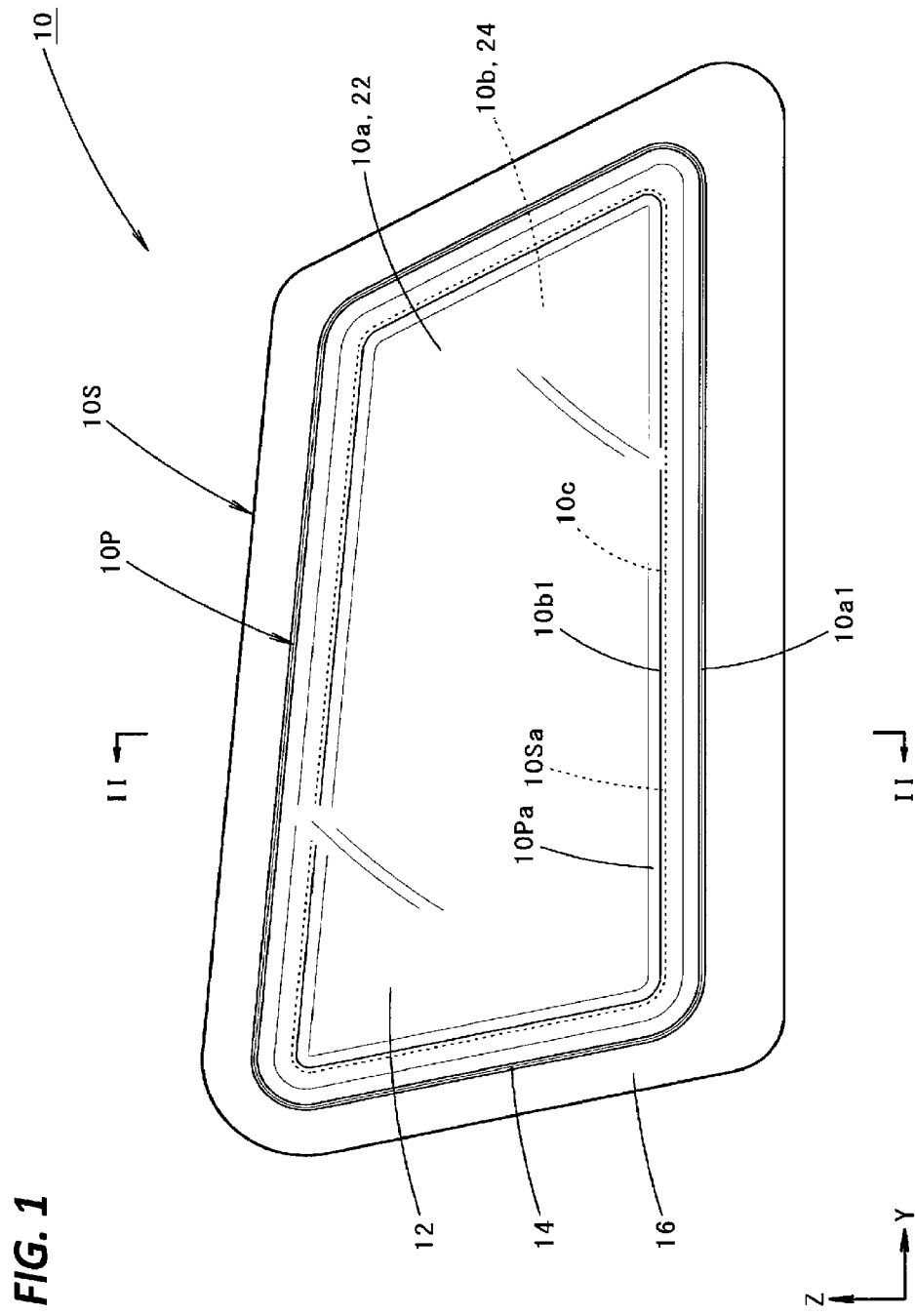
FIG. 1 is a front view illustrating a two-color molded lens according to an embodiment of the present disclosure.
Figure 2:
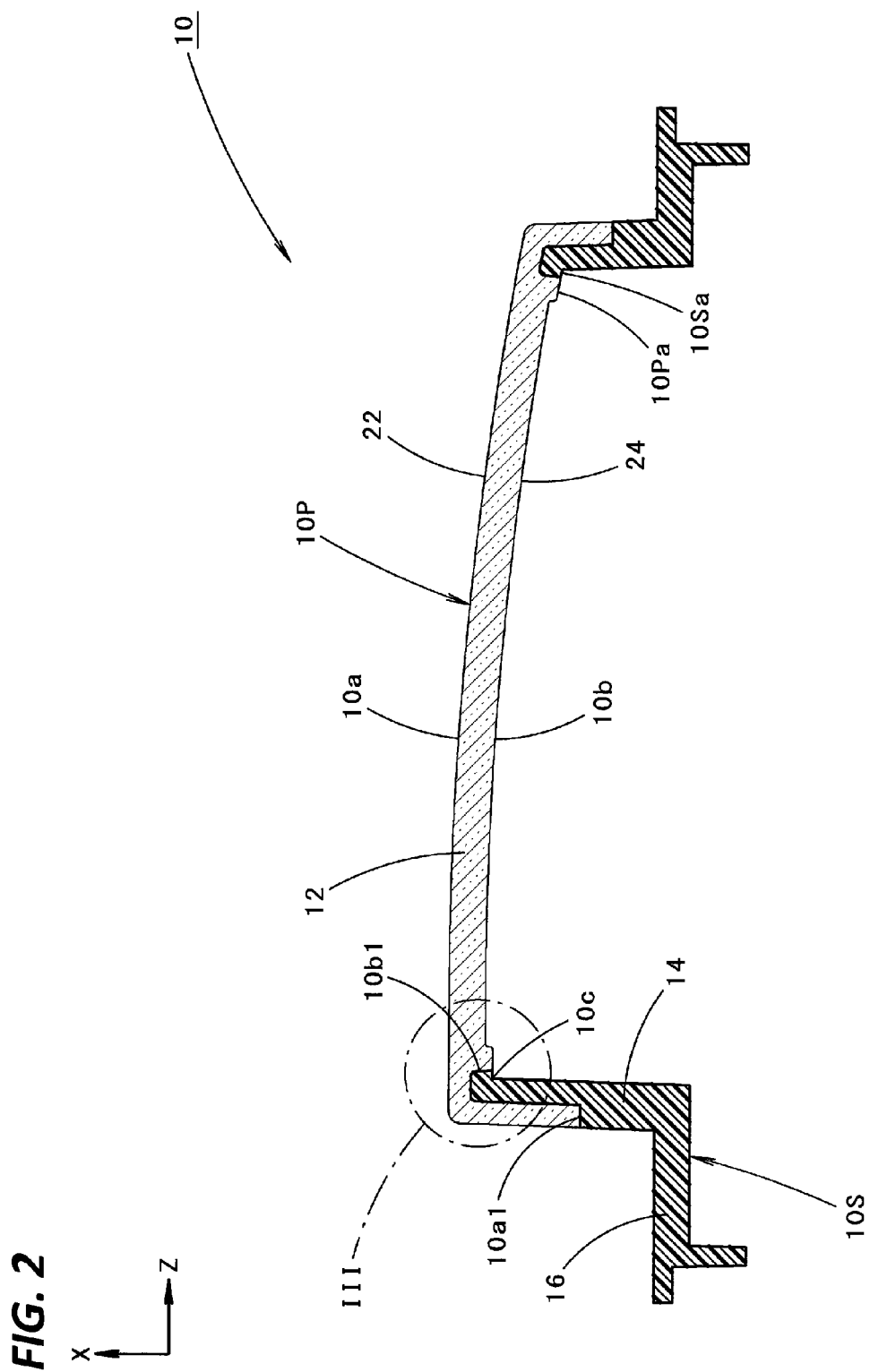
FIG. 2 is a cross-sectional view taken along line II-II of FIG. 1.

FIG. 1 is a front view illustrating a two-color molded lens 10 according to an embodiment of the present disclosure, and FIG. 2 is a cross-sectional view taken along line II-II of FIG. 1.

In such drawings, a direction indicated by X is a "front direction" of the two-color molded lens 10, a direction indicated by Y is a "left direction" orthogonal to the "front direction," and a direction indicated by Z is an "upward direction." This is also applied to other drawings.

As illustrated in FIG. 1, a two-color molded lens 10 according to the present embodiment serves as a light transmissive cover of a headlamp arranged at a right front end of a vehicle, and is constituted by a primary molded product 10P made of a transparent resin (e.g., colorless and transparent PC resin) and a secondary molded product 10S made of an opaque resin (e.g., black PC resin or ABS resin).

The two-color molded lens 10 includes a lens body portion 12 formed in a substantially rectangular shape that is laterally elongated when viewed from the front side of the lamp, a lens peripheral wall portion 14 extending from an outer peripheral edge of the lens body portion 12 toward an inner surface 10b side (i.e., the rear side) of the two-color molded lens 10, and an outer peripheral flange portion 16 extending from the rear end position of the lens peripheral wall portion 14 toward the outer peripheral side. Then, when the two-color molded lens 10 is mounted on a vehicle, the lens body portion 12 is configured to form a design surface extending along the surface shape of the vehicle body.

As illustrated in FIG. 2, the primary molded product 10P is formed to wrap around from the lens body portion 12 to the lens peripheral wall portion 14 along the outer surface 10a of the two-color molded lens. However, the secondary molded product 10S is formed to wrap around from the lens peripheral wall portion 14 to the lens body portion 12 along the inner surface 10b of the two-color molded lens.

A joining surface 10a1 between the primary molded product 10P and the secondary molded product 10S on the outer surface 10a side of the two-color molded lens 10 is positioned substantially in the middle of the lens body portion 12 and the outer peripheral flange portion 16 in the lens peripheral wall portion 14. However, a joining surface 10b1 between the primary molded product 10P and the secondary molded product 10S on the inner surface 10b side of the two-color molded lens 10 is positioned in the vicinity of the peripheral edge portion of the lens body portion 12.

The two-color molded lens 10 according to the present embodiment has a configuration in which a hard coating film 22 is formed on the outer surface 10a thereof and an anti-fogging coating film 24 is formed on the inner surface 10b thereof. At this time, the hard coating film 22 is formed to cover the entire region of the primary molded product 10P, and the anti-fogging coating film 24 is formed to cover the entire region of the primary molded product 10P as well.

Before describing a detailed structure of the two-color molded lens 10, a manufacturing process thereof will be described.

Parts (a1) to (a3) in FIG. 6 are views illustrating a hybrid type film forming step as a step in which a film forming operation is performed on the two-color molded lens 10 after the molding is completed.

With regard to the hybrid type film forming step, in a first step illustrated in part (a1) in FIG. 6, after forming the hard coating film 22 on the outer surface 10a of the two-color molded lens 10, the anti-fogging coating film 24 is formed on the inner surface 10b thereof. Next, in a second step illustrated in part (a2) in FIG. 6, the hard coating film 22 is cured by irradiation with ultraviolet rays. Finally, in a third step illustrated in part (a3) in FIG. 6, the anti-fogging coating film 24 is cured by heat.

In the first step illustrated in part (a1) in FIG. 6, the hard coating film 22 is formed in a state where the two-color molded lens 10 is loaded on a jig (not illustrated) provided on a turn table (not illustrated). After that, the turn table is rotated by 180°, and, in this state, the anti-fogging coating film 24 is formed.

Forming the hard coating film 22 is performed by spraying a hard coating material P1 from a nozzle 102 to the outer surface 10a while moving the nozzle 102 of a spray gun along the outer surface 10a of the two-color molded lens 10.

At this time, as the hard coating material P1, for example, an acrylic hard coating material made of an acrylic monomer, an ultraviolet absorber, a light stabilizer, a polymerization initiator, a solvent, and the like may be adopted.

Further, forming the anti-fogging coating film 24 is performed by spraying an anti-fogging coating material P2 from a nozzle 104 to the inner surface 10b while moving the nozzle 104 of a spray gun along the inner surface 10b of the two-color molded lens 10.

At this time, as the anti-fogging coating material P2, for example, an acrylic anti-fogging coating material made of an acrylic resin, a surfactant, a curing agent (catalyst), and the like may be adopted.

In the second step illustrated in part (a2) in FIG. 6 the hard coating film 22 applied onto the outer surface 10a is cured by irradiating ultraviolet rays from a ultraviolet irradiating device 106 to the outer surface 10a of the two-color molded lens 10. Prior to the irradiation with the ultraviolet rays, the two-color molded lens 10 may be heated by, for example, irradiation with infrared rays.

In the third step illustrated in part (a3) in FIG. 6, the anti-fogging coating film 24 applied onto the inner surface 10b is cured by putting the two-color molded lens 10 into a heating furnace 108 and heating the inner surface 10b with warm air at about 120° C.

The second and the third steps are performed consecutively by conveying the two-color molded lens 10 to a roller conveying path (not illustrated).

In the hybrid type film forming step, in addition to a worker for inspecting after the film formation, one worker 2 is assigned for performing a transferring operation of the two-color molded lens 10 from the turn table to the roller conveying path between the first step and the second step.

Meanwhile, parts (b1) to (b4) in FIG. 6 are views illustrating an independent film forming step which has been performed in the related art as a step for performing a film forming operation on the two-color molded lens 10 after the molding is completed.

First, in a first step illustrated in part (b1) in FIG. 6, the hard coating film 22 is formed on the outer surface 10a by spraying hard coating material P1 from the nozzle 102 to the outer surface 10a while moving a nozzle 102 of a spray gun along the outer surface 10a of the two-color molded lens 10.

Next, in a second step illustrated in part (b2) in FIG. 6 the hard coating film 22 applied onto the outer surface 10a is cured by irradiating ultraviolet rays from a ultraviolet irradiating device 106 to the outer surface 10a of the two-color molded lens 10.

Next, in a third step illustrated in part (b3) in FIG. 6, the anti-fogging coating film 24 is formed on the inner surface 10b by spraying anti-fogging coating material P2 from the nozzle 104 to the inner surface 10b while moving a nozzle 104 of a spray gun along the inner surface 10b of the two-color molded lens 10.

Finally, in a fourth step illustrated in (b4) in FIG. 6, the anti-fogging coating film 24 applied onto the inner surface 10b is cured by putting the two-color molded lens 10 into a heating furnace 108 and heating the inner surface 10b with warm air at about 120° C.

In the independent film forming step, in addition to a worker for inspecting after the film formation, one worker 2 is assigned for performing a transferring operation of the two-color molded lens 10 from a hard coating booth to a ultraviolet ray irradiating booth between the first step and the second step. Further, another worker 2 is assigned for performing a transferring operation of the two-color molded lens 10 from an anti-fogging coating booth to the heating furnace 108 between the third step and the fourth step. Further, if necessary, yet another worker 2 is assigned between the second step and the third step.

By switching the independent film forming step to the hybrid type film forming step, it is possible to reduce at least one worker 2.

Next, description will be made on a detailed structure of the two-color molded lens 10.

Figure 3:
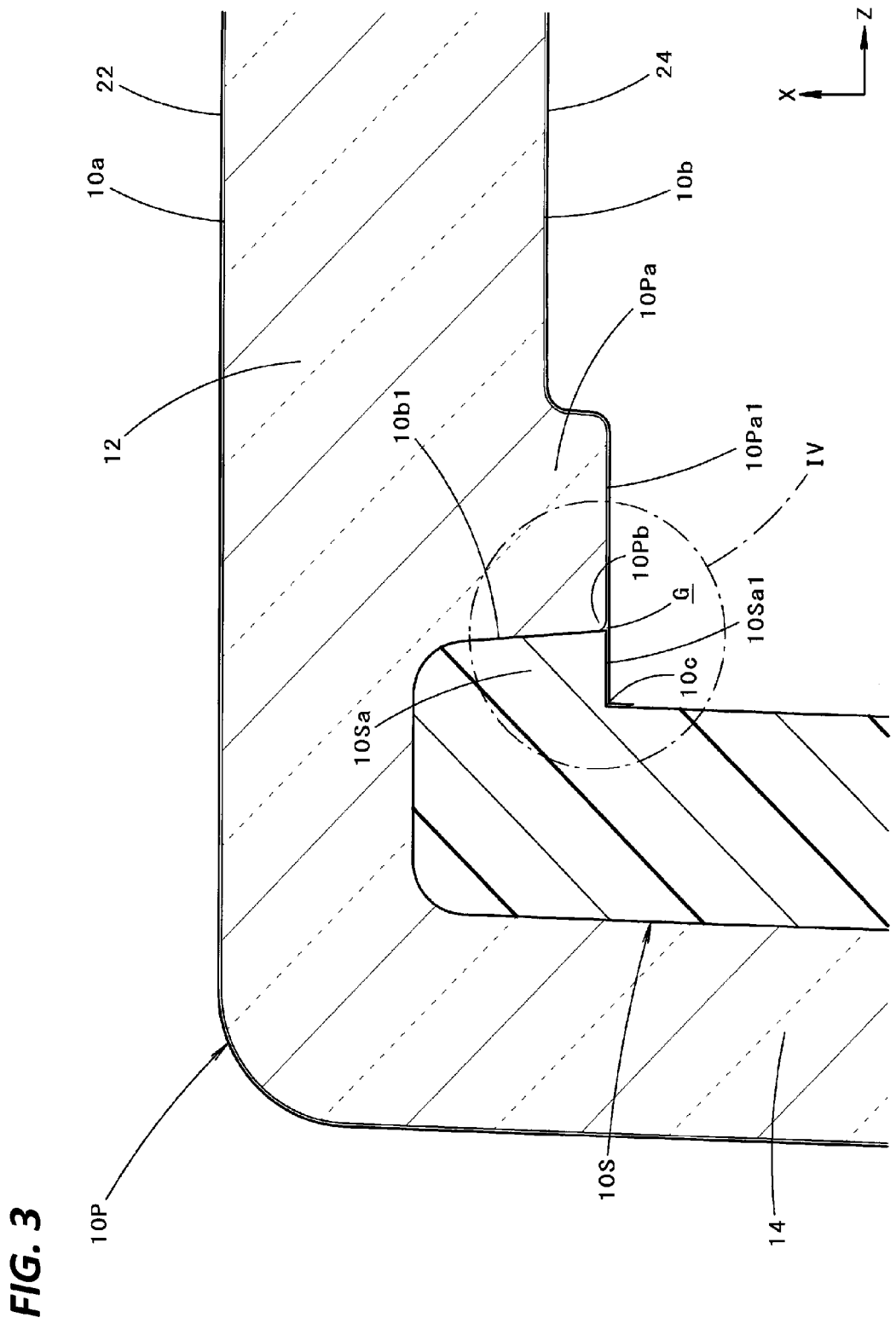
FIG. 3 is a detailed view illustrating a portion of III in FIG. 2.

FIG. 3 is a detailed view illustrating a portion of III in FIG. 2, and FIG. 4A is a detailed view illustrating a portion of IV in FIG. 3.

As illustrated in FIG. 3, in the primary molded product 10P, an annular region along the joining surface 10b1 is formed as a thick portion 10Pa which is stepped up toward the inner surface 10b side with respect to a normal region of the inner peripheral side.

Further, in the secondary molded product 10S, a body side wrap-around portion 10Sa which wraps around to the lens body portion 12 side is formed to be flush with an inner surface 10Pa1 of the thick portion 10Pa of the primary molded product 10P.

As illustrated in FIG. 4A, the position of the joining surface 10b1 is set at a position separated by a distance L from a connection position 10c of the lens body portion 12 and the lens peripheral wall portion 14 on the inner surface 10b side of the two-color molded lens 10. The distance L is set to a value of 0.5 mm or more (specifically, a value of approximately 1 mm).

The primary molded product 10P which is molded prior to the secondary molded product 10S has a configuration in which a corner R is formed at a corner portion 10Pb between the inner surface 10Pa1 and the joining surface 10b1.

In the present embodiment, the corner R formed at the corner portion 10Pb is set to a value of R0.2 mm or less (specifically, a value of approximately R0.1 mm). Such a small corner R may be formed by using, for example, an end mill having a sharp point at a tip when machining a mold for molding the primary molded product 10P.

As the corner R is formed at the corner portion 10Pb of the primary molded product 10P, on the inner surface 10b of the two-color molded lens 10, a groove-shaped gap G having a substantially wedge-shape in cross-section is formed along the corner portion 10Pb. However, the corner R is set to the value of R0.2 mm or less, and thus the gap G is formed as an extremely shallow gap.

FIG. 4B is a view similar to FIG. 4A, illustrating the two-color molded lens 10 in the middle of a hybrid type film forming step.

That is, in FIG. 4B, the two-color molded lens 10 is illustrated which is, after forming the anti-fogging coating film 24 on the inner surface 10B in the first step of the hybrid type film forming step (e.g., see part (a1) in FIG. 6), in a step before performing the curing of the anti-fogging coating film 24 in the third step (e.g., see part (a3) in FIG. 6).

In this step, the anti-fogging coating film 24 formed on the inner surface 10b of the two-color molded lens 10 is still in a state of an anti-fogging coating material having fluidity.

The anti-fogging coating material P2 is in a state of being applied substantially uniformly with a film thickness of several μm on the inner surface 10Sa1 of the body portion side wrap-around portion 10Sa of the secondary molded product 10S and the inner surface 10Pa1 of the thick portion 10Pa of the primary molded product 10P. However, a relatively large (e.g., larger than a predetermined value) coating material stagnation is formed in the vicinity of the connection position 10c of the lens body portion 12 and the lens peripheral wall portion 14, and also, the anti-fogging coating material P2 which has entered into the groove-shaped gap G forms a coating material stagnation slightly as well.

FIG. 5A is a view similar to FIG. 4B, illustrating a two-color molded lens 110 of related art in a step after forming the anti-fogging coating film 24 and before performing the curing of the anti-fogging coating film 24.

In the two-color molded lens 110, a corner R formed at a corner portion 110Pb of a joining surface 110b1 with respect to an inner surface 110Pa1 of a primary molded product 110P and a secondary molded product 110S is set to a value of approximately R0.3 mm.

Therefore, in an inner surface 110b of the two-color molded lens 110, a groove-shaped gap G which is relatively large (e.g., larger than a predetermined value) is formed along the corner portion 110Pb of the primary molded product 110P. Then, the anti-fogging coating material P2 entering into the groove-shaped gap G forms a relatively large (e.g., larger than a predetermined value) coating material stagnation.

In the two-color molded lens 110, the anti-fogging coating material P2 which is stagnant at the groove-shaped gap G is impregnated into the inside of the primary molded product 110P until performing the curing of the anti-fogging coating film 24. Therefore, cracks C are likely to be generated around the corner portion 110Pb of the primary molded product 110P.

In particular, when molding the secondary molded product 110S, the primary molded product 110P arranged in a mold is subjected to a pressing force F by the molten resin injected into the mold. Therefore, residual stress is generated around the corner portion 110Pb of the primary molded product 110P in the two-color molded lens 110 after the molding is completed. Thus, cracks C are more likely to be generated.

Then, when cracks C are generated around the corner portion 110Pb of the primary molded product 110P in this manner, the cracks C are seen through a transparent lens body portion 112. Therefore, a defective appearance is generated in the two-color molded lens 110.

Meanwhile, as illustrated in FIG. 4B, in the two-color molded lens 10 according to the present embodiment, the groove-shaped gap G is very small, and thus, an amount of the anti-fogging coating material P2 entering into the groove-shaped gap G is extremely small. Therefore, the anti-fogging coating material P2 hardly impregnates the inside of the primary molded product 10. As a result, even when the primary molded product 10P is subjected to the pressing force F, no cracks are generated around the corner portion 10Pb.

FIG. 5B is a view similar to FIG. 4B, illustrating a two-color molded lens 210 as a comparative example of the present embodiment in a step after forming the anti-fogging coating film 24 and before performing the curing of the anti-fogging coating film 24.

In the two-color molded lens 210, a distance L which is from a connection position 210c of a lens body portion 212 and a lens peripheral wall portion 214 on an inner surface 210b side to a joining surface 210b1 between an inner surface 210Pa1 of a primary molded product 210P and a secondary molded product 210S is set to a value of approximately 0.3 mm.

In the meantime, in the two-color molded lens 210, a corner R formed at a corner portion 210Pb between the inner surface 210Pa1 of the primary molded product 210P and the joining surface 210b1 is set to a value of approximately R0.1 mm, which is the same as that of the present embodiment.

In the two-color molded lens 210, the distance L from the connection position 210c to the joining surface 210b1 is relatively short (e.g., shorter than a predetermined value), the anti-fogging coating material P2 which is stagnant around the connection position 210c spreads to the corner portion 210Pb of the primary molded product 210P, thereby covering the groove-shaped gap G thickly. Then, the inside of the primary molded product 210P is impregnated with the anti-fogging coating material P2 thickly covering the groove-shaped gap G, and as a result, cracks C are more likely generated around the corner portion 210Pb of the primary molded product 210P.

Next, the operational effects of the present embodiment will be described.

In the two-color molded lens 10 according to the present embodiment, the secondary molded product 10S is formed to wrap around from the lens peripheral wall portion 14 to the lens body portion 12 along the inner surface 10b of the two-color molded lens 10. Since the joining surface 10b1 between the primary molded product 10P and the secondary molded product 10S on the inner surface 10b side is positioned in the lens body portion 12, the corner R is formed at the corner portion 10Pb between the inner surface 10Pa1 and the joining surface 10b1 on the primary molded product 10P. However, the corner R is set to a value of R0.2 mm or less, so that the groove-shaped gap G formed at the corner portion 10Pb of the primary molded product 10P may be extremely small.

Therefore, the two-color molded lens 10 according to the present embodiment has a configuration in which the hard coating film 24 is formed on the outer surface 10a thereof and an anti-fogging coating film 24 is formed on the inner surface 10b thereof, but even when such film forming operations are performed by a hybrid type film forming step which has a good operation efficiency, it is possible to minimize the amount of the anti-fogging coating material P2 that is stagnant at the groove-shaped gap G formed at the corner portion 10Pb of the primary molded product 10P.

Therefore, it is possible to effectively suppress the anti-fogging coating material P2 that is stagnant at the groove-shaped gap G formed at the corner portion 10Pb of the primary molded product 10P from being impregnated into the inside of the primary molded product 10P, and thus, the generation of cracks around the corner portion 10Pb of the primary molded product 10P may be effectively suppressed. As a result, it is possible to effectively suppress occurrence of a defective appearance in the two-color molded lens 10.

As described above, according to the present embodiment, in the two-color molded lens 10 in which the hard coating film 22 is formed on the outer surface 10a thereof and the anti-fogging coating film 24 is formed on the inner surface 10b thereof, it is possible to effectively suppress occurrence of the defective appearance after improving the operation efficiency in the manufacturing process thereof.

At this time, in the present embodiment, since the value of the corner R at the corner portion 10Pb of the primary molded product 10P is set to a value of R0.15 mm or less (specifically, a value of approximately R0.1 mm), the groove-shaped gap G formed at the corner portion 10Pb of the primary molded product 10P becomes small enough, so that the generation of cracks may be more effectively suppressed. As a result, the occurrence of the defective appearance of the two-color molded lens 10 may be more effectively suppressed.

In addition, in the present embodiment, the joining surface 10b1 between the primary molded product 10P and the secondary molded product 10S on the inner surface 10b side of the two-color molded lens 10 is positioned in the vicinity of the peripheral edge portion of the lens body portion 12, so that the majority of the lens body portion 12 may be effectively used as a transparent region.

At this time, in the present embodiment, the position of the joining surface 10b1 is set at a position separated by 0.5 mm or more from the connection position 10c of the lens body portion 12 and the lens peripheral wall portion 14 on the inner surface 10b side of the two-color molded lens 10, so that the following operational effects may be obtained.

That is, when the joining surface 10b1 positioned in the vicinity of the peripheral edge portion of the lens body portion 12 comes excessively close to the connection position 10c of the lens body portion 12 and the lens peripheral wall portion 14, the anti-fogging coating material P2 that is stagnant around the connection position 10c spreads to the corner portion 10Pb of the primary molded product 10P and thickly covers the groove-shaped gap G, and thus, cracks are likely to be generated around the corner portion 10Pb of the primary molded product 10P.

Meanwhile, as the present embodiment, by setting the position of the joining surface 10b1 at a position separated by 0.5 mm or more from the connection position 10c, it is possible to suppress the anti-fogging coating material P2 that is stagnant around the connection position 10c from spreading to the corner portion 10Pb of the primary molded product 10P. Therefore, it is possible to effectively suppress the groove-shaped gap G formed at the corner portion 10Pb of the primary molded product 10P from being covered with the anti-fogging coating material P2, so that the generation of cracks around the corner portion 10Pb of the primary molded product 10P may be effectively suppressed.

Meanwhile, in the present embodiment, since the position of the joining surface 10b1 is set at a position separated by 0.7 mm or more (specifically, a position separated by approximately 1 mm) from the connection position 10c, it is possible to more effectively suppress the anti-fogging coating material P2 that is stagnant around the connection position 10c spreading to the corner portion 10Pb of the primary molded product 10P.

Further, in the present embodiment, the inner surface 10Pa1 of the primary molded product 10P and the inner surface 10Sa1 of the secondary molded product 10S are formed to be flush with each other at the position of the joining surface 10b1, so that it is possible to prevent a step from being formed between the inner surface 10Pa1 of the primary molded product 10P and the inner surface 10Sa1 of the secondary molded product 10S positioned at both sides of the joining surface 10b1. Therefore, it is possible to prevent the anti-fogging coating material P2 from being stagnant around the joining surface 10b1 on the inner surface 10b side of the two-color molded lens 10, and thus, the generation of cracks due to the generation of the step may be prevented in advance.

In the above embodiment, the two-color molded lens 10 has been described as being a light transmissive cover of a vehicle headlamp, the same operational effects as in the above embodiment may be obtained even when used for other uses.

Numeric values shown as specifications in the above embodiments are merely illustrative, and different values may be, of course, set as appropriate.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A two-color molded lens comprising:
a lens body portion; and
a lens peripheral wall portion that rises toward an inner surface side of the two-color molded lens from a peripheral edge portion of the lens body portion,
wherein the two-color molded lens is constituted by a primary molded product made of a transparent resin and a secondary molded product made of an opaque resin,
the two-color molded lens is provided with a hard coating film on an outer surface thereof and an anti-fogging coating film on the inner surface thereof,
the primary molded product is formed to wrap around from the lens body portion to the lens peripheral wall portion along the outer surface of the two-color molded lens,
the secondary molded product is formed to wrap around from the lens peripheral wall portion to the lens body portion along the inner surface of the two-color molded lens,
a joining surface between the primary molded product and the secondary molded product on the inner surface side of the two-color molded lens is positioned in the lens body portion, and
in the primary molded product, a corner R formed at a corner portion between the inner surface of the primary molded product and the joining surface is set to a value of R0.2 mm or less.

2. The two-color molded lens according to claim 1, wherein the joining surface is positioned in a vicinity of the peripheral edge portion of the lens body portion.

3. The two-color molded lens according to claim 2, wherein the joining surface is set at a position separated by 0.5 mm or more from a connection position of the lens body portion and the lens peripheral wall portion on the inner surface side of the two-color molded lens.

4. The two-color molded lens according to claim 1, wherein the inner surface of the primary molded product and the inner surface of the secondary molded product are formed to be flush with each other at a position of the joining surface.

5. The two-color molded lens according to claim 2, wherein the inner surface of the primary molded product and the inner surface of the secondary molded product are formed to be flush with each other at a position of the joining surface.

6. The two-color molded lens according to claim 3, wherein the inner surface of the primary molded product and the inner surface of the secondary molded product are formed to be flush with each other at a position of the joining surface.

* * * * *